United States Patent
Smith

(10) Patent No.: US 7,040,749 B2
(45) Date of Patent: May 9, 2006

(54) AUXILIARY LENS ASSEMBLY WITH IMPROVED ATTACHMENT TO PRIMARY LENS ASSEMBLY

(75) Inventor: Greg Smith, Plano, TX (US)

(73) Assignee: E'lite Optik U.S. L.P., Carrollton, TX (US)

( * ) Notice: Subject to any disclaimer, the term of this patent is extended or adjusted under 35 U.S.C. 154(b) by 0 days.

(21) Appl. No.: 10/903,696

(22) Filed: Jul. 30, 2004

(65) Prior Publication Data

US 2006/0023159 A1    Feb. 2, 2006

(51) Int. Cl.
*G02C 9/00*    (2006.01)

(52) U.S. Cl. .......................................... 351/47; 351/57
(58) Field of Classification Search ................ 351/47, 351/48, 57, 58
See application file for complete search history.

(56) References Cited

U.S. PATENT DOCUMENTS

| | | | |
|---|---|---|---|
| 3,238,005 A | 3/1966 | Petitto | |
| 3,252,747 A | 5/1966 | Robins | |
| 4,070,103 A | 1/1978 | Meeker | |
| 5,376,977 A | 12/1994 | Liu | |
| 5,416,537 A | 5/1995 | Sadler | |
| 5,568,207 A | 10/1996 | Chao | |
| 5,737,054 A | 4/1998 | Chao | |
| 5,894,335 A * | 4/1999 | Hoffman | 351/47 |
| 5,929,964 A * | 7/1999 | Chao | 351/47 |
| 6,089,708 A | 7/2000 | Ku | |
| 6,474,811 B1 | 11/2002 | Liu | |
| 6,601,953 B1 | 8/2003 | Xiao | |
| 6,702,439 B1 * | 3/2004 | Lee | 351/47 |
| 6,827,437 B1 | 12/2004 | Kim | |

* cited by examiner

*Primary Examiner*—Huy Mai
(74) *Attorney, Agent, or Firm*—Storm LLP; John J. Fischer; John J. Patti

(57) ABSTRACT

A primary assembly includes a primary frame that secures a pair of primary lenses in position relative to one another. A primary extension is located on the outer periphery of each end of the primary frame and has an aperture formed therein extending generally parallel to the primary lenses. A pair of arms is connected to each one of the primary extensions by a hinge. An auxiliary assembly includes an auxiliary frame that secures a pair of auxiliary lenses in position relative to one another. A pair of auxiliary extensions is positioned on each end of the outer periphery of the auxiliary frame. The auxiliary extensions are adapted to be received in the apertures in the primary extensions, wherein the auxiliary assembly is removably secured to the primary assembly.

12 Claims, 7 Drawing Sheets

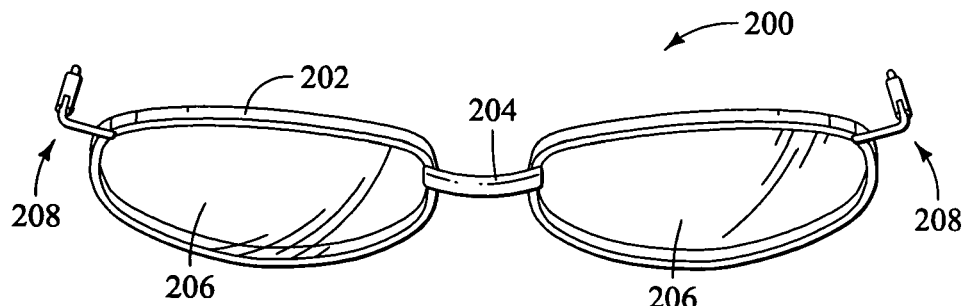
FIG. 4
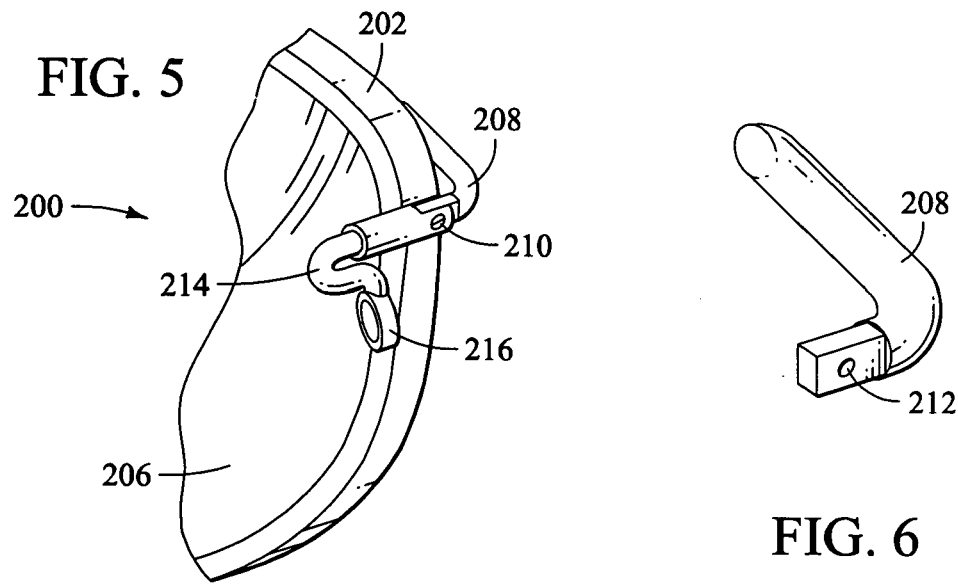
FIG. 5
FIG. 6
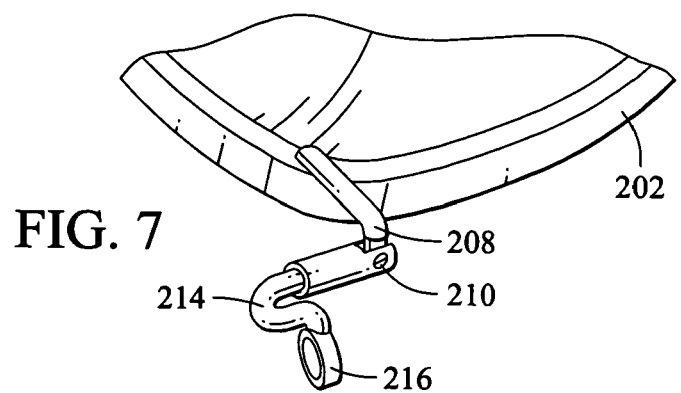
FIG. 7

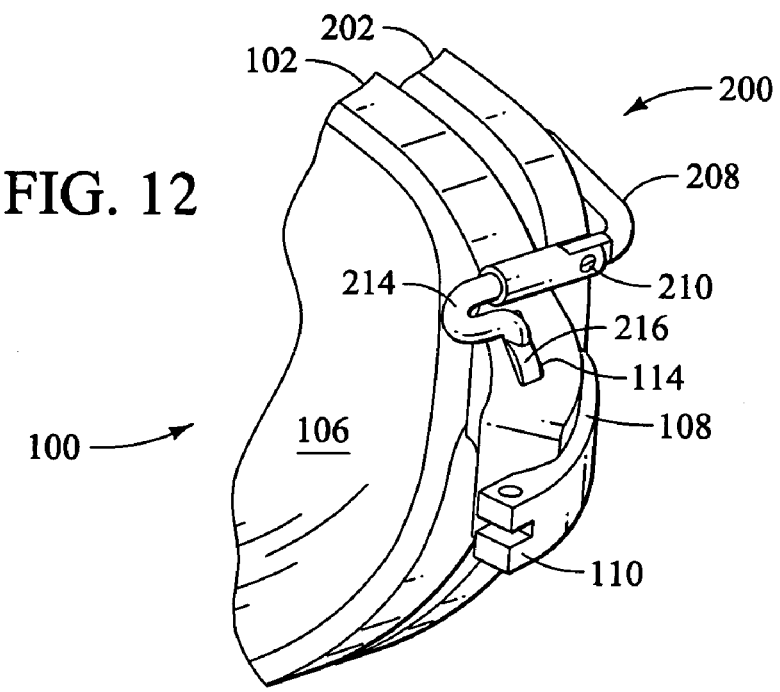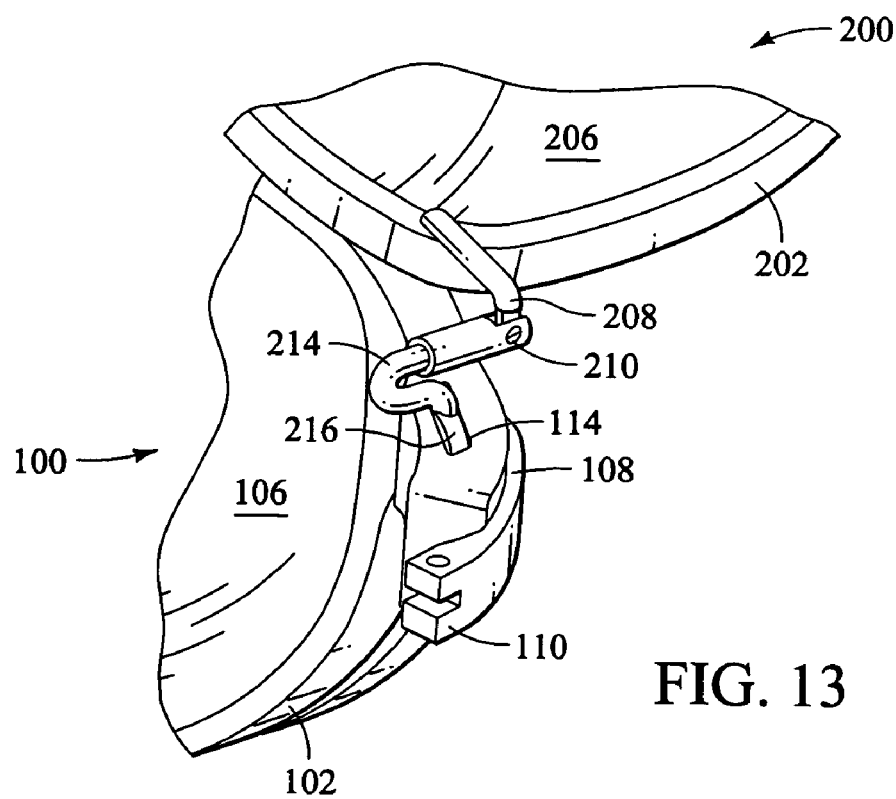

AUXILIARY LENS ASSEMBLY WITH IMPROVED ATTACHMENT TO PRIMARY LENS ASSEMBLY

TECHNICAL FIELD OF INVENTION

The present invention relates to eyewear, and in particular, to a safety shield for eyewear. More particularly, the present invention relates to safety shields for eyewear that are capable of accommodating auxiliary lens assemblies, such as clip-on sunglasses.

BACKGROUND OF THE INVENTION

It has long been desirable to have a removable auxiliary lens assembly attached to eyeglasses. Professional baseball players have used "flip-up" auxiliary lenses for more than four decades to protect their eyes from the sun, but to allow them unrestricted vision in the event the ball was hit in their vicinity without the necessity of removing the auxiliary lens assembly from the primary assembly altogether.

Various means have been provided for attaching flip-up or hinged auxiliary lenses to a primary lens assembly. Typically, the means of attachment between the primary and auxiliary lens assembly is either complex and difficult and expensive to manufacture, or flimsy (and easily manufactured). A need exists, therefore, for improved means for attachment of hinged auxiliary lens assemblies to primary lens assemblies that is both robust in its attachment, yet easily manufactured.

SUMMARY OF INVENTION

A primary advantage of the present invention is that it provides an eyewear assembly with an improved means of attaching an auxiliary frame and lens assembly to the primary or main frame and lens assembly.

In accordance with one aspect of the invention, a primary lens assembly includes a primary frame that secures a pair of primary lenses in position relative to one another. A primary extension is located on the outer periphery of each end of the primary frame and has an aperture formed therein extending generally parallel to the primary lenses. A pair of arms is connected to each one of the primary extensions by a hinge. An auxiliary lens assembly includes an auxiliary frame that secures a pair of auxiliary lenses in position relative to one another. A pair of auxiliary extensions is positioned on each end of the outer periphery of the auxiliary frame. The auxiliary extensions are adapted to be received in the apertures in the primary extensions, wherein the auxiliary lens assembly is removably secured to the primary lens assembly.

In accordance with one aspect of the invention, a magnetic disc is provided on the terminal end of each auxiliary extension, the magnetic disc being adapted to be received in the aperture in each primary extension.

In accordance with one aspect of the invention, each aperture in each auxiliary extension includes a portion of magnetizable material capable of being attracted by the magnetic disc.

In accordance with one aspect of the invention, a hinge is associated with each auxiliary extension, wherein the auxiliary lens assembly can be rotated about the hinge between a raised position and a lowered position.

Other advantages of the present invention will become apparent from the following descriptions, taken in connection with the accompanying drawings, wherein, by way of illustration and example, an embodiment of the present invention is disclosed. As referred to hereinabove, the "present invention" refers to one or more embodiments of the present invention which may or may not be claimed, and such references are not intended to limit the language of the claims, or to be used to construe the claims in a limiting manner.

BRIEF DESCRIPTION OF THE DRAWINGS

FIG. 4 is an isometric view of the eyewear assembly according to the preferred embodiment of the present invention, showing only the auxiliary lens assembly.

FIG. 5 is an enlarged view of a portion of the auxiliary assembly of FIGS. 1 and 4.

FIG. 6 is an enlarged view of a portion of the auxiliary lens assembly shown in FIG. 5.

FIG. 7 is an enlarged view of a portion of the eyewear assembly of FIGS. 1 and 4 illustrating the auxiliary lens assembly in the raised position.

FIG. 12 is an enlarged view of a portion of the attachment point between the primary and auxiliary lens assemblies of FIGS. 1 through 9.

FIG. 13 is an enlarged view of a portion of the attachment point between the primary and auxiliary lens assemblies of FIG. 10, showing the auxiliary lens assembly in the raised position.

DETAILED DESCRIPTION OF THE INVENTION

Figure 1:
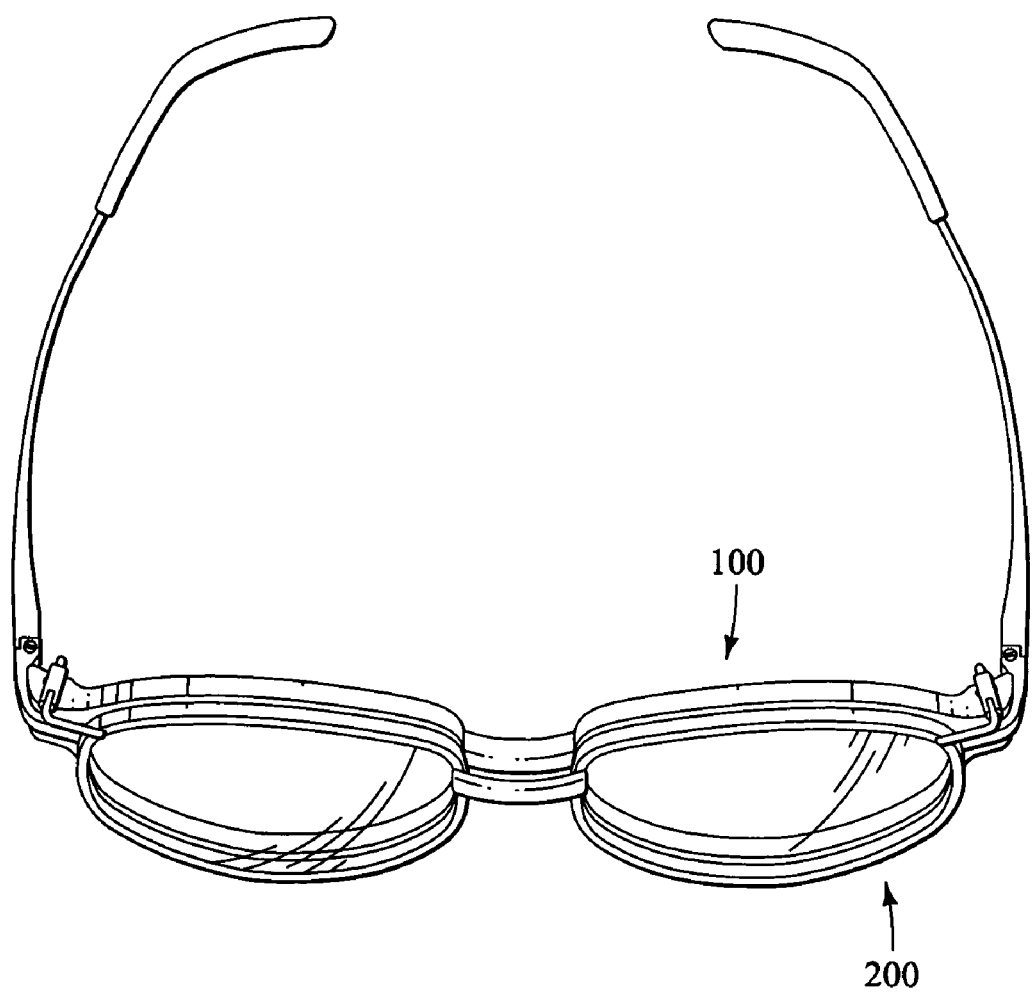
FIG. 1 is an isometric view of the eyewear assembly according to the preferred embodiment of the present invention including both the primary and auxiliary lens and frame assemblies.
Figure 2:
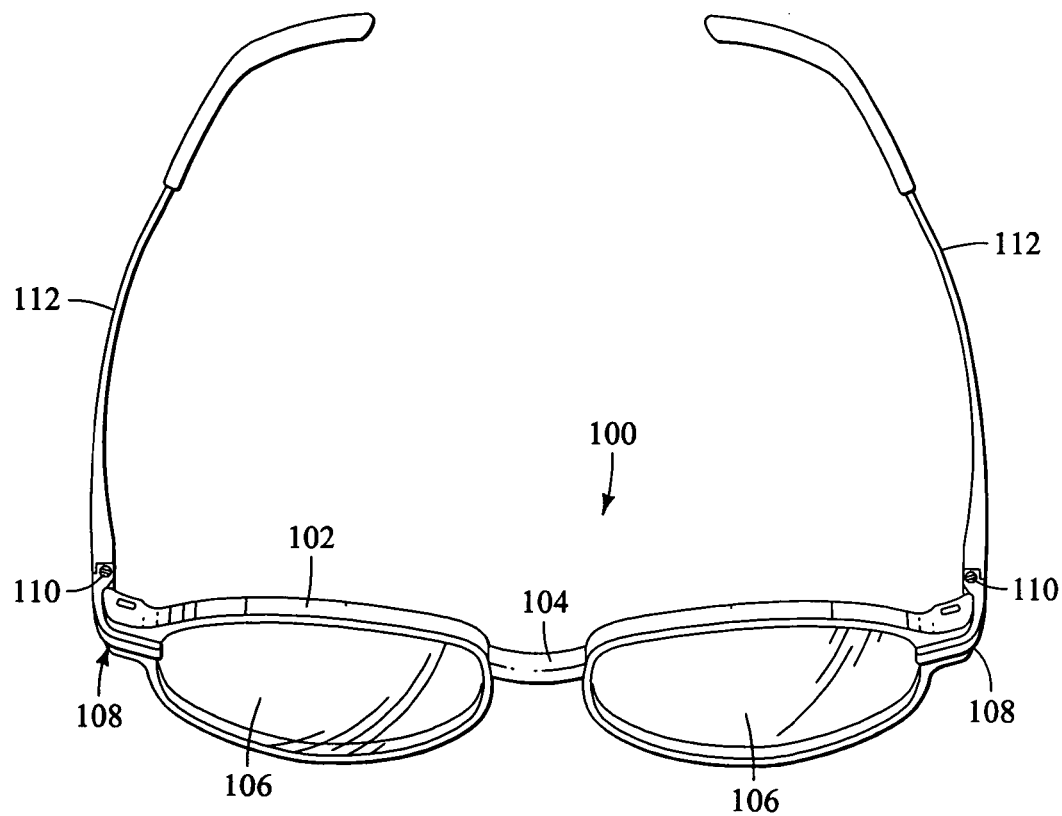
FIG. 2 is an isometric view of the eyewear assembly according to the preferred embodiment of the present invention, showing only the primary lens assembly.

Referring now to the FIGURES and particularly to FIG. 1, an eyewear assembly according to the present invention is shown that includes both a primary frame and lens assembly 100 and an auxiliary frame and lens assembly 200. As illustrated in FIGS. 1 and 2, the eyewear assembly comprises a primary lens assembly 100 that has a primary frame 102. A bridge 104 connects the right and left portions of primary frame 102, each of which holds a primary lens 106, which may be a protective lens, corrective lens, or a colored lens. At the outer periphery of each lens, frame 102 has an extension 108.

A hinge 110 connects an arm or temple 112 to each extension 108. Each arm 112 terminates in an earpiece (shown in FIGS. 1 and 2). Primary frame 102, bridge 104, and arms 112 cooperate to locate primary lens assembly 100 on the face of the wearer and to locate primary lenses 106 relative to one another and to the wearer's eyes.

Figure 3:
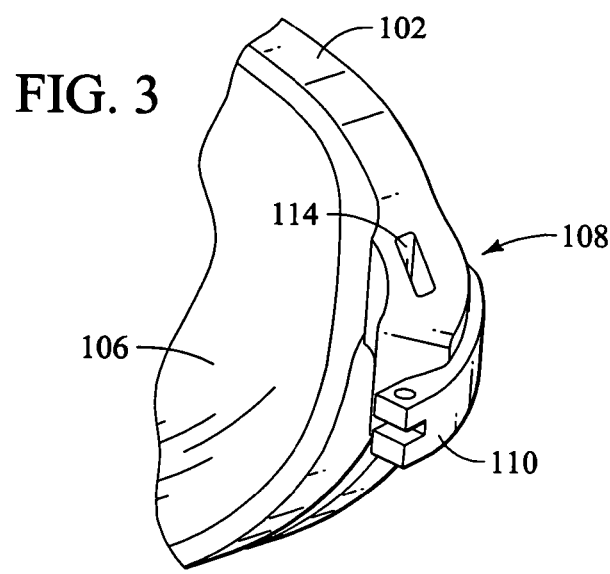
FIG. 3 is an enlarged view of a portion of the primary lens assembly of FIGS. 1 and 2.
Figure 8:
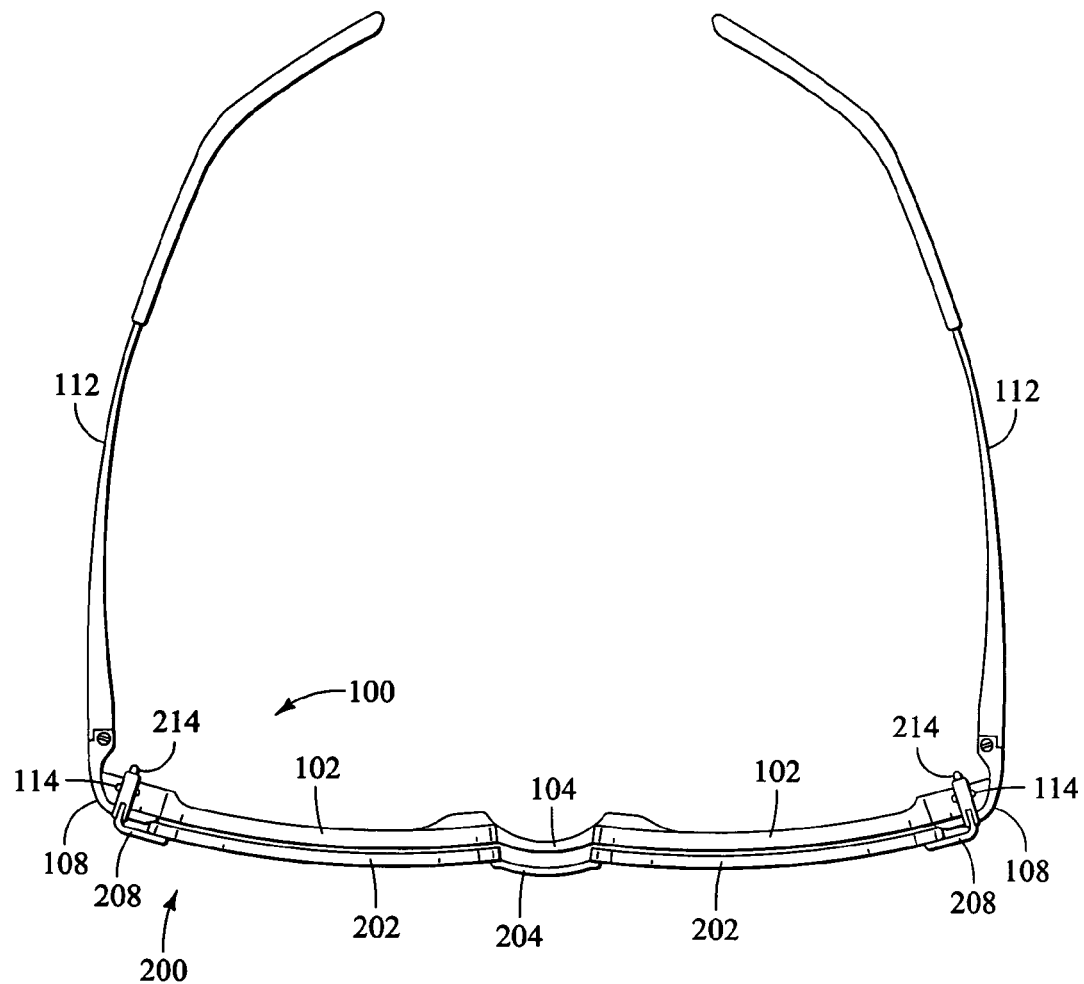
FIG. 8 is a plan view of the eyewear assembly according to the preferred embodiment of the present invention including both the primary and auxiliary lens assemblies.
Figure 9:
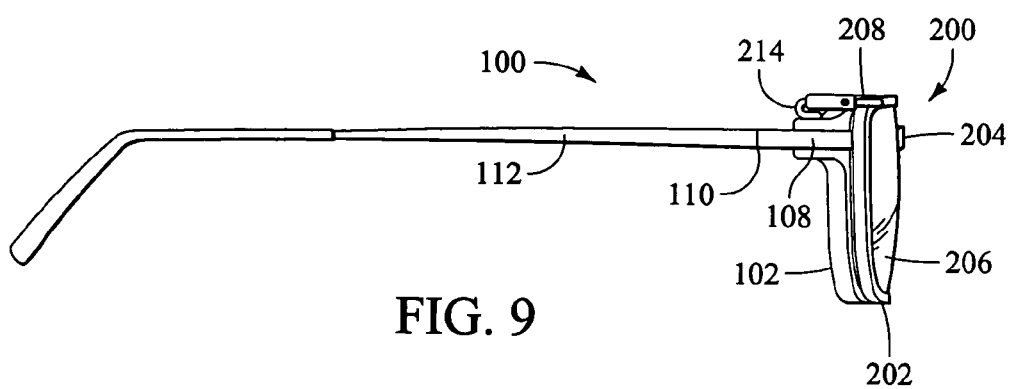
FIG. 9 is a side view of the eyewear assembly of FIG. 8.
Figure 10:
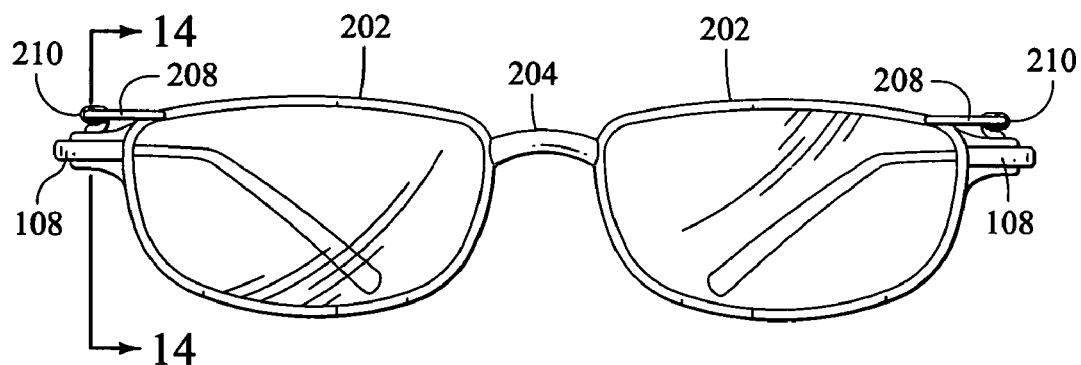
FIG. 10 is an elevation view of the assembled primary and auxiliary lens assemblies illustrating the auxiliary assembly in the lowered position.
Figure 11:
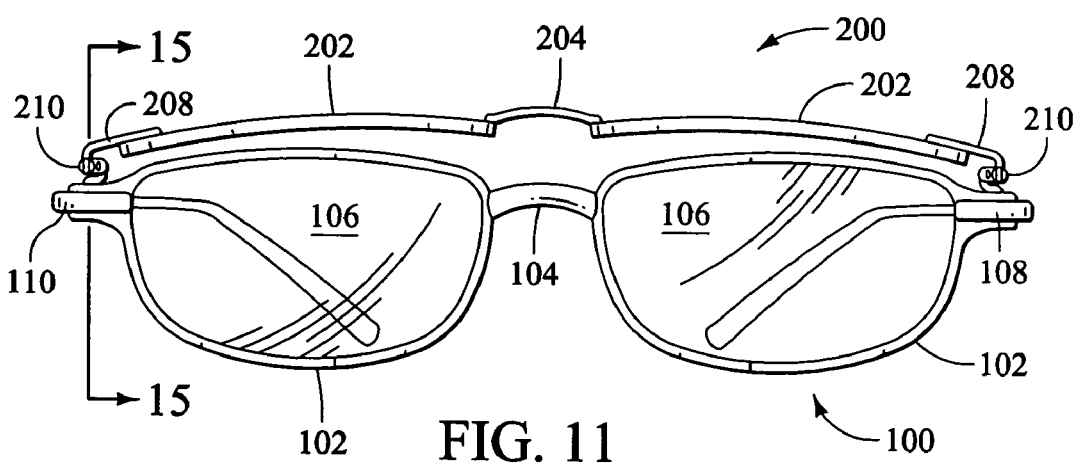
FIG. 11 is an elevation view of the assembled primary and auxiliary lens assemblies illustrating the auxiliary lens assembly in the raised position.

As shown in FIG. 3, an aperture in the form of a vertically extending, rectangular slot 114 is formed in a portion of extension 108 of primary frame 102 between lens 106 and hinge 110. As is illustrated, slot 114 is formed in a heavy-section portion of primary frame 102. Any number of construction alternatives may suffice to satisfy the function of slot 114, as will be described below.

FIG. 4 illustrates an auxiliary frame assembly 200, which comprises an auxiliary frame 202, which has a bridge 204 connecting right and left portions of frame 202 that holds a pair of auxiliary lenses 206, which may be protective lenses, corrective lenses, or colored lenses, but are different from primary lenses 106. A pair of extensions 208 extend from frame 202 in a location that corresponds to the location of extensions 108 on primary lens assembly 100.

FIGS. 5 through 7 illustrate a hinge and portion of the auxiliary lens assembly attachment that is associated with auxiliary lens assembly 200. Extension 208, which is preferably formed of heavy-gauge wire, terminates in a rectangular-section with an aperture 212 drilled through it. This, in turn is received by a hinge extension 214 and conventionally secured there with a screw to form a hinge 210, which permits auxiliary frame 202 to be rotated about hinge 210 between raised (FIG. 7) and lowered (FIG. 5) positions. The end of hinge extensions 214 is turned down and terminates in a disc 216. In one preferred embodiment of the present invention, disc 216 may have magnetizable material contained therein. In another preferred embodiment of the present invention, disc 216 may contain a magnetizable disc contained therein.

FIGS. 8 through 11 are views of primary 100 and auxiliary 200 lens assemblies, assembled together that show the conventional relationships between primary 106 and auxiliary 206 lenses and their corresponding frames 102, 202. In particular, the relationship between discs 216 of auxiliary extensions 208 and slots 114 of primary extensions 208 are shown. FIGS. 12 through 15 illustrate in greater detail how disc 216 on hinge extension 214 is received within aperture or slot 114 formed in primary extension 108. These figures also illustrate auxiliary lens assembly 200 in lowered (FIGS. 12 and 14) and raised (FIGS. 13 and 15) positions, while disc 216 remains engaged in slot 114, holding auxiliary lens assembly 200 securely to primary lens assembly 100.

Figure 14:
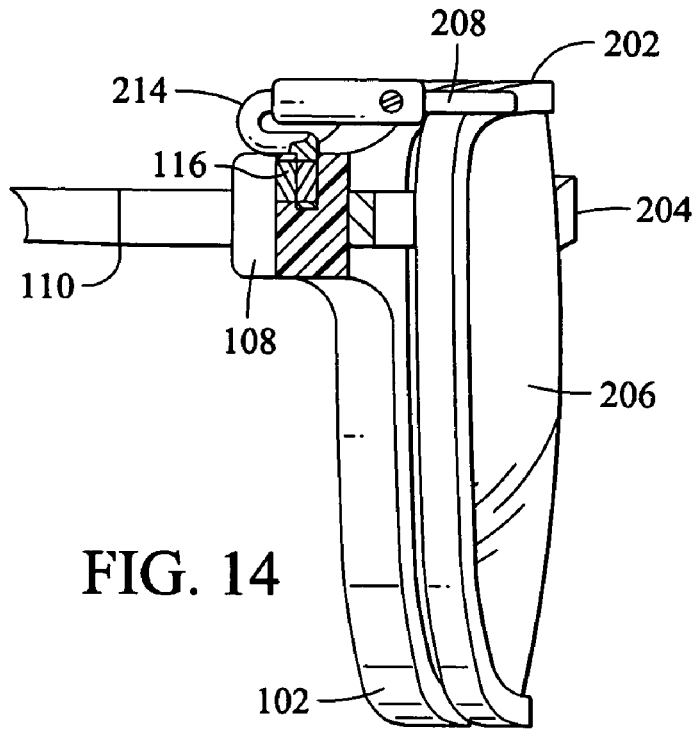
FIG. 14 is an elevation view, partially in section along the line 14—14 in FIG. 10, of the attachment point between the primary and auxiliary lens assemblies.
Figure 15:
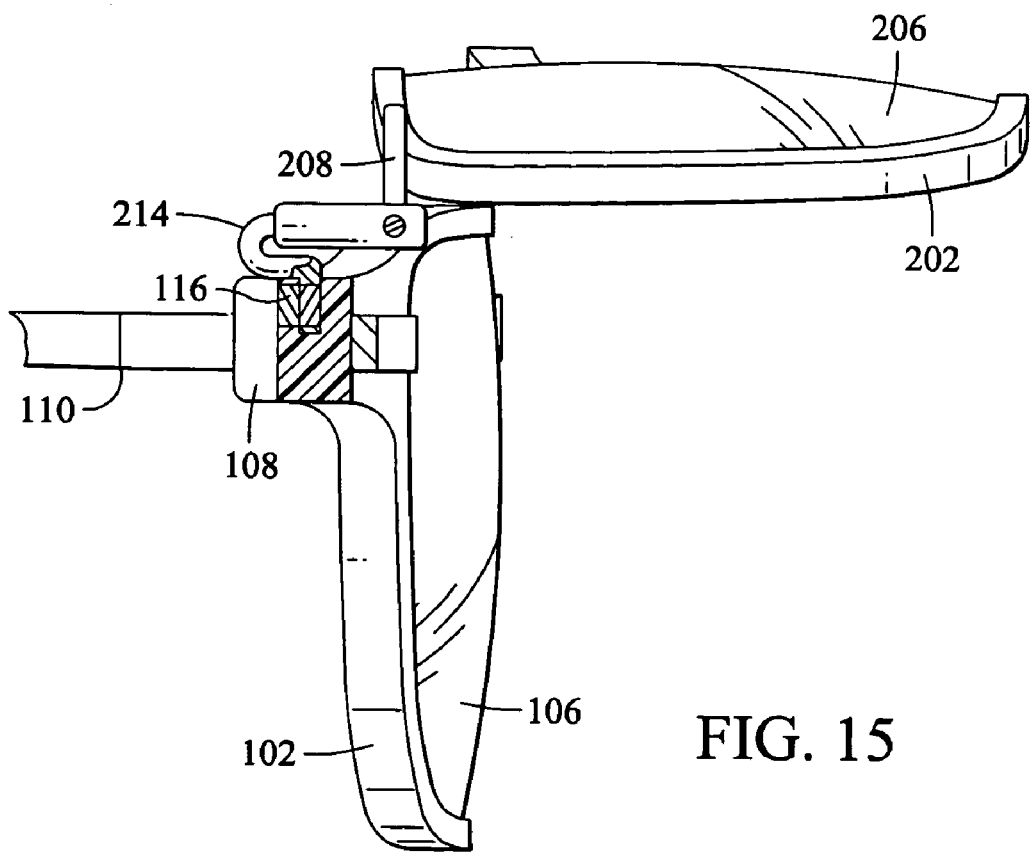
FIG. 15 is an elevation view, partially in section along the line 15—15 in FIG. 11, of the attachment point between the primary and auxiliary lens assemblies.

As shown in FIGS. 14 and 15, disc 216 at the end of each hinge extension 214 associated with auxiliary lens assembly 200 is received in aperture or slot 114 formed in extension 108 associated with primary frame assembly 100. Both disc 216 and aperture 114 extend generally vertically and in a plane generally parallel to primary lenses 106 and frame 102. Slot 114 is rectangular in configuration and has a width and depth sufficient to accommodate the diameter of disc 216 and a height sufficient to accommodate the thickness of disc 216. According to the preferred embodiment, slot 114 is dimensioned to permit disc 216 to move slightly within slot 114 and disc 216 can be secured within slot 114 by magnetic attraction. To this end, a magnetic or magnetizable material 116 forms a portion (as illustrated, the rearward wall) of slot or aperture 114. This material 116 is adhered or molded into extension 108. Attraction between this material 116 and disc 216 retains the disc in the slot and secures auxiliary lens assembly 200 relative to primary lens assembly 100.

Accordingly, either or both disc 216 and material 116 may be formed of magnetized or magnetizable material to facilitate attraction between the two (e.g. disc 216 is a magnet and material 116 is iron). Alternatively, for example, disc 216 can form an interference fit with aperture 114, provided a sufficiently flexible or resilient material is employed.

In operation, auxiliary frame assembly 200 is secured to primary frame assembly 100 simply by engaging discs 216 in slots 114. This temporarily and removably secures the two together. By provision of a hinge 210 in auxiliary extension 208, auxiliary lens assembly 200 may be rotated between raised and lowered positions relative to primary lens assembly 100, thereby providing "flip-up" capability.

In a preferred embodiment, the primary lenses (held in primary frame 102) are corrective lenses and the auxiliary lenses (held in auxiliary frame 202) are light transmission reducing lenses, for example polarizing, absorbing, refracting, photochromatic, or reflecting lenses, or any combination thereof (i.e., sunglasses). In a preferred embodiment, the primary lenses are impact resistant safety lenses and the auxiliary lenses are light transmission reducing lenses, such as welding lenses. In another preferred embodiment, the primary lenses are corrective lenses and the auxiliary lenses are impact resistant safety lenses.

The eyewear assembly according to the present invention has a number of advantages. The principal advantage is that the attachment mechanism between the primary and auxiliary lens assemblies is relatively simple in manufacture and operation, yet positively secures the two together. This saves cost to the eyewear purchaser and wearer and reduces the number of pairs of eyewear the wearer must account for as a result of breakage of flimsy or poorly constructed eyewear.

The invention has been described with reference to a preferred embodiment thereof. It is thus not limited, but is susceptible to variation and modification without departing from the scope and spirit of the invention.

I claim:

1. An eyewear assembly comprising:
   a primary lens assembly including a primary frame that secures a pair of primary lenses in position relative to one another;
   a pair of primary extensions, each positioned on an outer periphery of the primary frame and having a rectangular aperture formed therein extending generally parallel to the primary lenses;
   a pair of arms, each connected to one of the primary extensions by a hinge;
   an auxiliary lens assembly including an auxiliary frame that secures a pair of auxiliary lenses in position relative to one another; and
   a pair of auxiliary extensions, each positioned on an outer periphery of the auxiliary frame, the auxiliary extensions each having a disc adapted to be received in the apertures in the primary extensions, wherein the auxiliary lens assembly is removably secured to the primary lens assembly.

2. The eyewear assembly according to claim 1 further comprising:
   the discs comprising magnetic discs.

3. The eyewear assembly according to claim 2, wherein each aperture in each auxiliary extension includes a magnetizable material capable of being attracted by the magnetic disc.

4. The eyewear assembly according to claim 2, wherein the aperture is a rectangular slot having a width that corresponds with a diameter of the magnetic disc, and a height that corresponds with a thickness of the magnetic disc.

5. The eyewear assembly according to claim 1, further comprising:
   a second hinge located on each auxiliary extension, wherein the auxiliary lens assembly can be rotated about the second hinge between a raised position and a lowered position.

6. The eyewear assembly according to claim 1, wherein the primary lenses are corrective lenses.

7. The eyewear assembly according to claim 1 further comprising:
   the discs comprising a flexible material.

8. An eyewear assembly comprising:
   a primary lens assembly including a primary frame that secures a pair of primary lenses in position relative to one another;
   a pair of primary extensions, each positioned on an outer periphery of the primary frame and having a rectangular aperture formed therein extending generally parallel to the primary lenses;
   a pair of arms, each connected to one of the primary extensions by a hinge;
   an auxiliary lens assembly including an auxiliary frame that secures a pair of auxiliary lenses in position relative to one another; and
   a pair of auxiliary extensions, each positioned on an outer periphery of the auxiliary frame, each auxiliary extension terminating in a magnetic disc, the magnetic disc adapted to be received and magnetically retained in the apertures in the primary extensions, wherein the auxiliary lens assembly is removably secured to the primary lens assembly.

9. The eyewear assembly according to claim 8, wherein rectangular aperture is formed integral to the primary frame.

10. The eyewear assembly according to claim 9, wherein the aperture is a rectangular slot having a width that corresponds with a diameter of the magnetic disc, and a height that corresponds with a thickness of the magnetic disc.

11. The eyewear assembly according to claim 8, further comprising:
    a second hinge located on each auxiliary extension, wherein the auxiliary lens assembly can be rotated about the second hinge between a raised position and a lowered position.

12. The eyewear assembly according to claim 8, wherein the primary lenses are corrective lenses.

* * * * *